United States Patent Office 2,750,078
Patented June 12, 1956

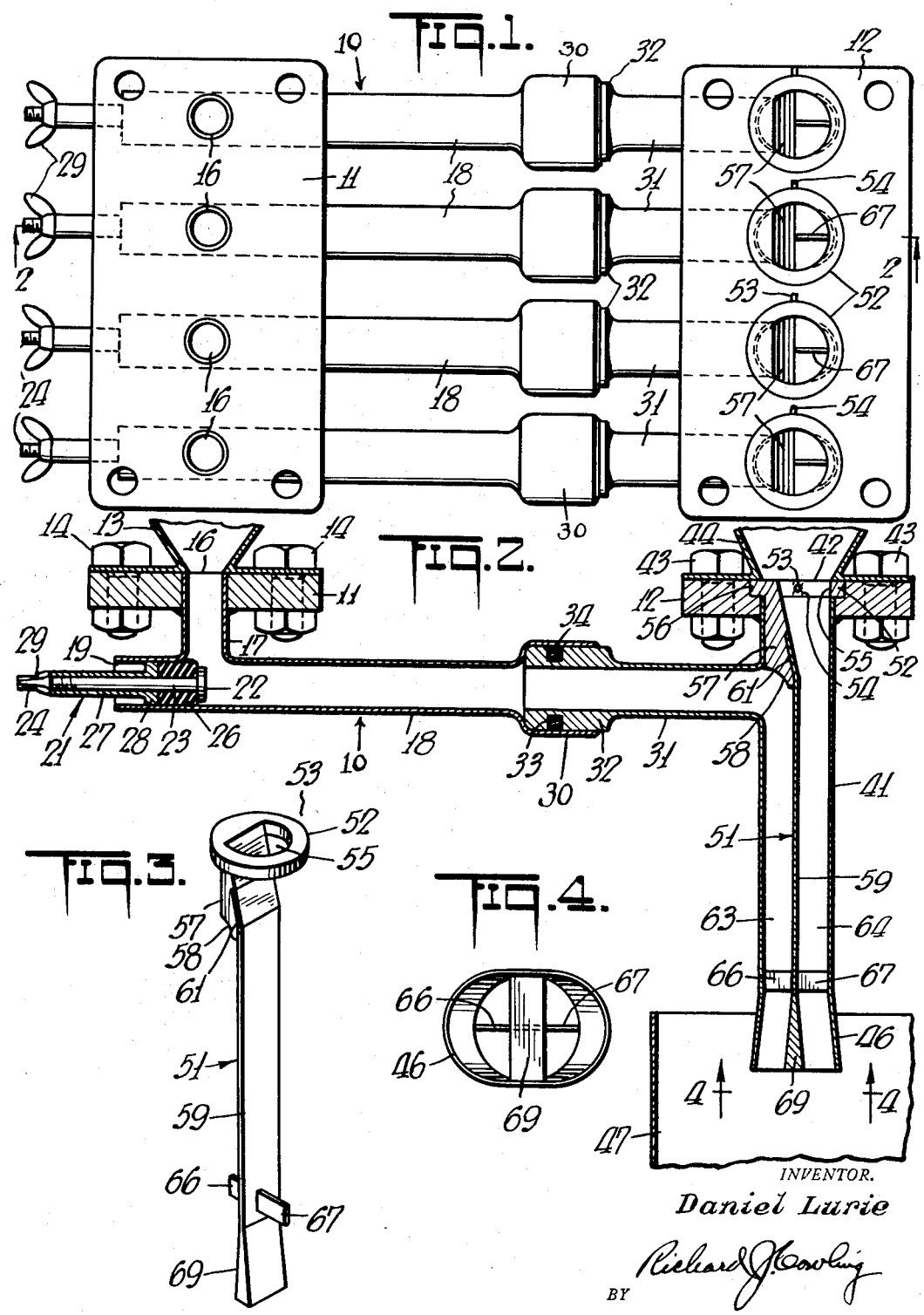

2,750,078

FILLING NOZZLE HAVING REMOVABLE DIVIDER

Daniel Lurie, New York, N. Y., assignor to Joe Lowe Corporation, New York, N. Y., a corporation of Delaware Application January 11, 1954, Serial No. 403,279

4 Claims. (Cl. 222—135)

The present invention relates generally to apparatus for making two flavored confections consisting of ice cream and the like substances, and it has particular relation to a filling nozzle attachment for conventional cup filling machines for filling simultaneously a row of spaced individual cavities of a conventional frozen confection mold with two different substances.

There are many different types of nozzles for discharging ice cream and the like substances, but most of them are designed for used with one or more conventional continuous freezers for filling bulk and packaged items. With the present invention, there is provided a filling nozzle attachment for a conventional cup filling machine capable of handling two different substances, whereby contrasting colors of ice cream and the like substances may be discharged directly into the individual cavities of a conventional frozen confection mold, thereby permitting the manufacture of multiflavored frozen confections with standard equipment to be found in every modern ice cream plant.

An object of the present invention is to provide a novel, efficient and inexpensive nozzle attachment for cup filling machines capable of handling two substances, which may be easily attached and detached from said machines.

Another object of the invention is the provision of a sanitary nozzle, which is easily and quickly assembled and disassembled for cleaning purposes.

A further object of the invention is the provision of a filling nozzle attachment for cup filling machines handling two different flavors for making frozen confections in standard molds, which permits the assembly and reassembly of one-half of the attachment at a time, whereby a change in one of the materials may be made from time to time without requiring a complete assembly and disassembly of the entire nozzle for cleaning purposes.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, in which:

Figure 1 is a top plan view of an assembled nozzle attachment made in accordance with the principles of the invention;

Figure 2 is a longitudinal sectional view of the nozzle attachment shown in Figure 1, the same having been taken substantially along the line 2—2 thereof, looking in the direction of the arrows, and also showing the manner in which the assembly is attached to the bottom of the plural hoppers of a conventional cup filling machine which provides the filling pressures and the sources of supply;

Figure 3 is an enlarged perspective view of the removable divider tube mounted in the large delivery tube for preventing the commingling of the substances in the final discharge tube through which it is delivered into the individual mold cavities of a conventional confectionery mold; and Figure 4 is an enlarged sectional view of the discharge tube shown in Figure 1, the same having been taken substantially along the line 4—4 thereof.

It will be noted that each of the mounting plates 11 and 12 has four spaced inlet openings 16 through which the respective materials are received. The number and spacing of such openings may be varied at will depending upon the conditions under which the attachment is to be used. In the present invention and illustrations, the attachment nozzle 10 has been designed for use in filling the individual cavities of a conventional frozen stick confectionery mold (not shown), which contains four laterally spaced rows of six individual cavities each, which rows are spaced so that one inlet opening will be centrally over one cavity of each row as the mold is passed therebelow.

The mounting plate 11 is designed to be attached to the bottom of a hopper 13 by means of suitable bolts and nuts 14, as best shown in Figure 2. Each of the inlet openings 16, extending vertically through the mounting plate 11, has a short depending receiving tube 17 mounted fixedly therein, as by welding, etc. Each tube 17 is, in turn, formed integrally with a longitudinally extending horizontal tube 18 at a point spaced intermediate the ends thereof. The short ends of the tubes 18 have an open end 19, each of which is adapted to receive an adjustable plug valve 21 for varying the rate of flow of the basic material from the receiving tube 17 into the horizontal tube 18 by restricting the opening therebetween.

Each plug valve 21 is made in a sanitary manner whereby it may be easily and quickly removed from its open end 19 of its tube 18 for cleaning purposes. Each valve 21 consists of a metal cylindrical base member 22 having a diameter substantially equal to the inner diameter of the tube 18. A rod 23 is mounted axially of the one side of the base member 22. The rod 23 is of a substantial length and has its outer free end threaded, as indicated at 24. A cylindrically shaped expansion ring 26 is mounted axially over the rod 23 adjacent the base member 22, and is made of rubber or plastic of the type approved for sanitary fittings by various health authorities. A tubular sleeve 27, having a base ring 28 corresponding in size substantially to the base member 22, is adapted to be mounted over the rod 23 so that its threaded free end projects therefrom. A wing nut 29 is adapted to be mounted on the threaded end 24 of the rod 23. When the wing nut 29 is adjacent the outer free ends of the threaded portion 24, the assembled valve 21 will slide freely inside of the tube 18, but when the wing nut 29 is threaded down on the rod 23, forcing the ring 28 towards the base member 22, the resilient ring 26 is expanded radially, as best shown in Figure 2, by compression between the base member 22 and the ring 28, whereby it is secured frictionally in a fixed position within the horizontal tube 18. By varying the position of the plug valve 21 with respect of the communicating opening between the tubes 17 and 18, it is possible to control accurately the flow of the substance from the hopper 13 into the tube 18. The opposite or delivery end of each of the longitudinal tubes 16 is enlarged for a short distance adjacent its end, as indicated at 30, to provide receiving means for a sanitary connection with a tube 31, having an enlarged outside diameter substantially equal to the inside diameter of the enlarged section 30 of the tube 18. The enlarged free ends 32 of the tubes 31 have a thicker wall structure than the remainder of the tube for providing an annular recess 33 for receiving a sanitary plastic or rubber sealing gasket 34, which insures a readily separable leak-proof telescopic joint between the enlarged sections 30 and 32 of the tubes 18 and 31, respectively.

The delivery ends of each of the tubes 31 is in open communication intermediate the ends of an enlarged vertically extending discharge tube 41. The upper end of each of the tubes 41 is welded or otherwise secured permanently in the receiving openings 42 of the attaching plate 12, which, in turn, is adapted to be secured by nuts and bolts 43 to the bottom of a hopper 44 of a conventional cup filling machine. This hopper 44 is adapted to receive a substance which is of a contrasting color to the substance being dispensed from the hopper 13. The lower or depending free ends to each of the vertical tubes 41 projects a substantial distance below the junction of the lateral tube 31, and has its lower delivery end enlarged or flared, as indicated at 46, to facilitate delivery into the open-top cavities 47 of a conventional frozen confectionery mold when the same is positioned therebelow.

A removable divider 51, having a seating ring 52 mounted around its upper end, is provided with a radial pin 53, which is adapted to engage a slot 54 in a recessed shoulder 56 formed in each of the inlet openings 42, as best shown in Figure 2. The radial pin 53 prevents the divider 51 from turning circumferentially due to the moving pressure exerted by the substance flowing through the receiving tube 31 into the discharge tube 41. An integrally formed and wedge-shaped flange 57 projects downwardly from one side of the ring member 52, thereby reducing or restricting the opening 42 to communication only with one side or one-half of the ring member 52. This flange 57 terminates at the top of the passageway in the tube 31 where it enters into the discharge tube 41, and has a concaved edge, as indicated at 58, to direct the flow of material from the receiving tube 31 downwardly into the discharge tube 41. A relatively thin and long fin 59 is mounted fixedly, as by welding, on the inner side of the flange 54, as indicated at 61, and projects axially downwardly to the end of said discharge tube 41. The fin 59 has a width equal to the inner diameter of the discharge tube 41, whereby it divides said tube 41 into two equal passageways 63 and 64. The fin 59 is provided intermediate its ends with a pair of diametrically extending radial arms 66 and 67, which serve to maintain its lower end in proper axial alignment within the discharge tube 41. The extreme lower end of the divider fin 59 has a downwardly and outwardly increasing thickness, as indicated at 69, to provide a slight restriction for each of the discharge openings 63 and 64, assuring the discharge of the substances outwardly towards the outer sides of the mold cavities 47.

It will be readily apparent that this construction permits the rapid assembly and disassembly of the attachment for cleaning purposes at the end of each day, or when a change in flavor is desired, or when a different type of confection is to be made as by the attachment shown in my co-pending application Serial No. 403,280, filed on even date herewith, without requiring tools of any kind.

In the operation of the attachment apparatus for the formation of multiple flavored frozen confections from a conventional double hopper cup filling machine, whereby it is desired to discharge two substances of contrasting colors into a single cavity 47 of a multiple cavity mold (not shown), it will be understood that the materials from the receiving hoppers 13 and 44 are delivered into their respective receiving tubes 17 and 41 under synchronized and equal and intermittent pressures. It is necessary to provide intermittent pressure in order to permit movement of the mold structure to present unfilled cavities to the discharge tubes after one row of cavities has been filled.

The amount of substance flowing from the hopper 13 into the tube 17 and then into and through the tube 18 is controlled by the position of the plug valve 21. The substance flowing through the tube 18 passes into and through the connecting tube 31, into and through the section 63 of the discharge tube 41, which is the section closed off by the divider 51.

The amount of the contrasting substance being delivered from the hopper 44 is controlled partially by the size of the opening 55 in the divider ring 52. The contrasting substance is received from the hopper 44 into the open-top 55 of the divider ring 52 under pressure, whereupon it will entirely fill up the open side of the tube 41 and eventually pass out through the bottom discharge opening 64. The contrasting substance, being under intermittent pressure, will pass intermittently out of the bottom of the discharge opening 64 in the delivery tube 41. Of course, it will be appreciated that since the substance flowing from the hopper 13 is also under synchronized, equal and intermittent pressure with the substance flowing out of the hopper 44, it will be flowing down the other section 63 of the tube 41, and both substances will be discharged simultaneously and intermittently from the openings 63 and 64 at the bottom of the tube 41. There can be no corresponding adjustment of the amount of flow of the substance from the hopper 44 unless a different mounting ring is substituted having a larger or smaller opening. It has never been found practical or feasible to attempt to control the ratio of the substances flowing from plural hoppers by differences in pumping or feeding pressures since equal pressures are required on both substances to obtain the optimum efficiency and result. However, the volume of flow of the substances from both hoppers 13 and 44 will be dependent upon the timing adjustment of the delivery openings in the cup-filling machines, which permits adjustment for any desired volume between certain limits.

Although I have only described in detail one modification which the invention may assume, it will be readily apparent to those skilled in the art that various other modifications may be made therein without departing from the spirit thereof or from the scope of the appended claims.

What I claim is:

1. A readily separable sanitary nozzle having a single open-top discharge tube for dispensing simultaneously under pressure contrasting ice creams and the like substances from different sources of supply into an individual cavity of a multi-cavity confectionery mold which comprises means for attaching said nozzle to a first source of supply and delivering the first substance to an inlet intermediate the ends of said discharge tube, means mounted above said intermediate inlet for attaching said nozzle and discharge tube to a second source of supply, and means mounted removably within the open-top of said discharge tube for dividing it into two sections, said means having a flange for sealing-off the top of said section carrying said first substance.

2. A readily separable sanitary nozzle having a single open-top discharge tube for dispensing simultaneously under pressure contrasting ice creams and the like substances from different sources of supply into an individual cavity of a multi-cavity confectionery mold which comprises means for attaching said nozzle to a first source of supply and delivering the first substance to an inlet intermediate the ends of said discharge tube, means mounted above said intermediate inlet for attaching said nozzle and discharge tube to a second source of supply, and a ring mounted removably within the open-top of said discharge tube having means for preventing its rotation, said ring having a depending flange for sealing off the open-top of said section carrying said first substance, said flange having a depending fin for sub-dividing the remainder of said discharge tube into two sections, said fin having radial arms adjacent its lower end for maintaining said end in axial alignment within said discharge tube when under pressure of said substances.

3. A readily separable sanitary nozzle having a single open-top discharge tube for dispensing simultaneously under pressure contrasting ice creams and the like substances from different sources of supply into an individual cavity of a multi-cavity confectionery mold which comprises means for attaching said nozzle to a first source of supply and delivering the first substance to an inlet intermediate the ends of said discharge tube, means mounted above said intermediate inlet for attaching said nozzle and discharge tube to a second source of supply, and a ring mounted removably within the open-top of said discharge tube having a depending flange for sealing-off the open-top of said section carrying said first substance, said flange having a depending fin for dividing the remainder of said discharge tube throughout its length into two sections.

4. A readily separable sanitary nozzle having a single open-top discharge tube for dispensing simultaneously under pressure contrasting ice creams and the like substances from different sources of supply into an individual cavity of a multi-cavity confectionery mold which comprises means for attaching said nozzle to a first source of supply and delivering the first substance to an inlet intermediate the ends of said discharge tube, means mounted above said intermediate inlet for attaching said nozzle and discharge tube to a second source of supply, and a ring mounted removably within the open-top of said discharge tube having means for preventing its rotation, said ring having a depending flange for closing off the open-top of said tube above the inlet for said first substance, said flange having a depending fin provided with a wedge shaped enlargement contiguous to its lower end for providing a restricted passageway at the exit end of said discharge tube.

References Cited in the file of this patent
UNITED STATES PATENTS 2,280,776   Allen _____ Apr. 28, 1942